United States Patent
Daishi et al.

(10) Patent No.: US 9,588,380 B2
(45) Date of Patent: Mar. 7, 2017

(54) LIQUID CRYSTAL DISPLAY DEVICE INCLUDING AN AUXILIARY CAPACITANCE LINE WITH A BRANCH PORTION

(71) Applicant: Japan Display Inc., Minato-ku (JP)

(72) Inventors: Kazuya Daishi, Minato-ku (JP); Masato Nakamura, Minato-ku (JP)

(73) Assignee: Japan Display Inc., Minato-ku (JP)

(*) Notice: Subject to any disclaimer, the term of this patent is extended or adjusted under 35 U.S.C. 154(b) by 182 days.

(21) Appl. No.: 14/317,458

(22) Filed: Jun. 27, 2014

(65) Prior Publication Data

US 2015/0009467 A1 Jan. 8, 2015

(30) Foreign Application Priority Data

Jul. 3, 2013 (JP) ................... 2013-139718

(51) Int. Cl.
| | |
|---|---|
| *G02F 1/1343* | (2006.01) |
| *G02F 1/1345* | (2006.01) |
| *G02F 1/1339* | (2006.01) |
| *G02F 1/1362* | (2006.01) |
| *G02F 1/1368* | (2006.01) |

(52) U.S. Cl.
CPC ........ *G02F 1/13394* (2013.01); *G02F 1/1368* (2013.01); *G02F 1/134336* (2013.01); *G02F 1/136286* (2013.01); *G02F 2001/134318* (2013.01)

(58) Field of Classification Search
CPC ..... G02F 1/136286; G02F 2001/13606; G02F 1/13394; G02F 1/136209; G02F 1/136213; G02F 1/134336; G02F 2001/13629

See application file for complete search history.

(56) References Cited

U.S. PATENT DOCUMENTS

| | | | |
|---|---|---|---|
| 2005/0001945 A1* | 1/2005 | Iki ................. | G02F 1/136209 349/44 |
| 2010/0182549 A1* | 7/2010 | Miyashita ......... | G02F 1/133514 349/106 |

(Continued)

FOREIGN PATENT DOCUMENTS

| | | |
|---|---|---|
| JP | 2012-18322 | 1/2012 |
| JP | 2014-32346 | 2/2014 |

*Primary Examiner* — Huyen Ngo
(74) *Attorney, Agent, or Firm* — Oblon, McClelland, Maier & Neustadt, L.L.P.

(57) ABSTRACT

A liquid crystal display device, including: an array substrate including: a first pixel electrode, first and second source lines arranged in a first direction and extending in a second crossing direction, a first gate line, an auxiliary capacitance line, a second gate line arranged in the second direction and extending in the first direction, and a switching element including a semiconductor layer which includes a first portion overlapping the first source line and extending in the second direction and a second portion overlapping the auxiliary capacitance line and extending in the first direction. The auxiliary capacitance line includes a branch portion extending along the first source line toward the second gate line and formed on a layer between the first source line and the semiconductor layer. The array substrate includes first and second shield layers, and the first shield layer formed larger than the second shield layer.

6 Claims, 6 Drawing Sheets

(56) References Cited

U.S. PATENT DOCUMENTS

| | | | |
|---|---|---|---|
| 2010/0245223 A1* | 9/2010 | Asako | G02F 1/136286 345/92 |
| 2012/0008080 A1 | 1/2012 | Daishi | |
| 2014/0036210 A1 | 2/2014 | Nakamura | |

* cited by examiner

LIQUID CRYSTAL DISPLAY DEVICE INCLUDING AN AUXILIARY CAPACITANCE LINE WITH A BRANCH PORTION

CROSS-REFERENCE TO RELATED APPLICATION

This application is based upon and claims the benefit of priority from prior Japanese Patent Application No. 2013-139718 filed Jul. 3, 2013, the entire contents of which are incorporated herein by reference.

FIELD

Embodiments described herein relate generally to a liquid crystal display device.

BACKGROUND

The liquid crystal display device is installed in various electronic devices. Many active-matrix type liquid crystal display panels are used for the liquid crystal display device, for example. The liquid crystal display panel is equipped with an array substrate, a counter substrate and a liquid crystal layer held therebetween. The array substrate includes a plurality of gate lines and source lines crossing each other, and Thin Film Transistor (TFT) as a switching element arranged in a circumference where the gate line and the source line cross.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
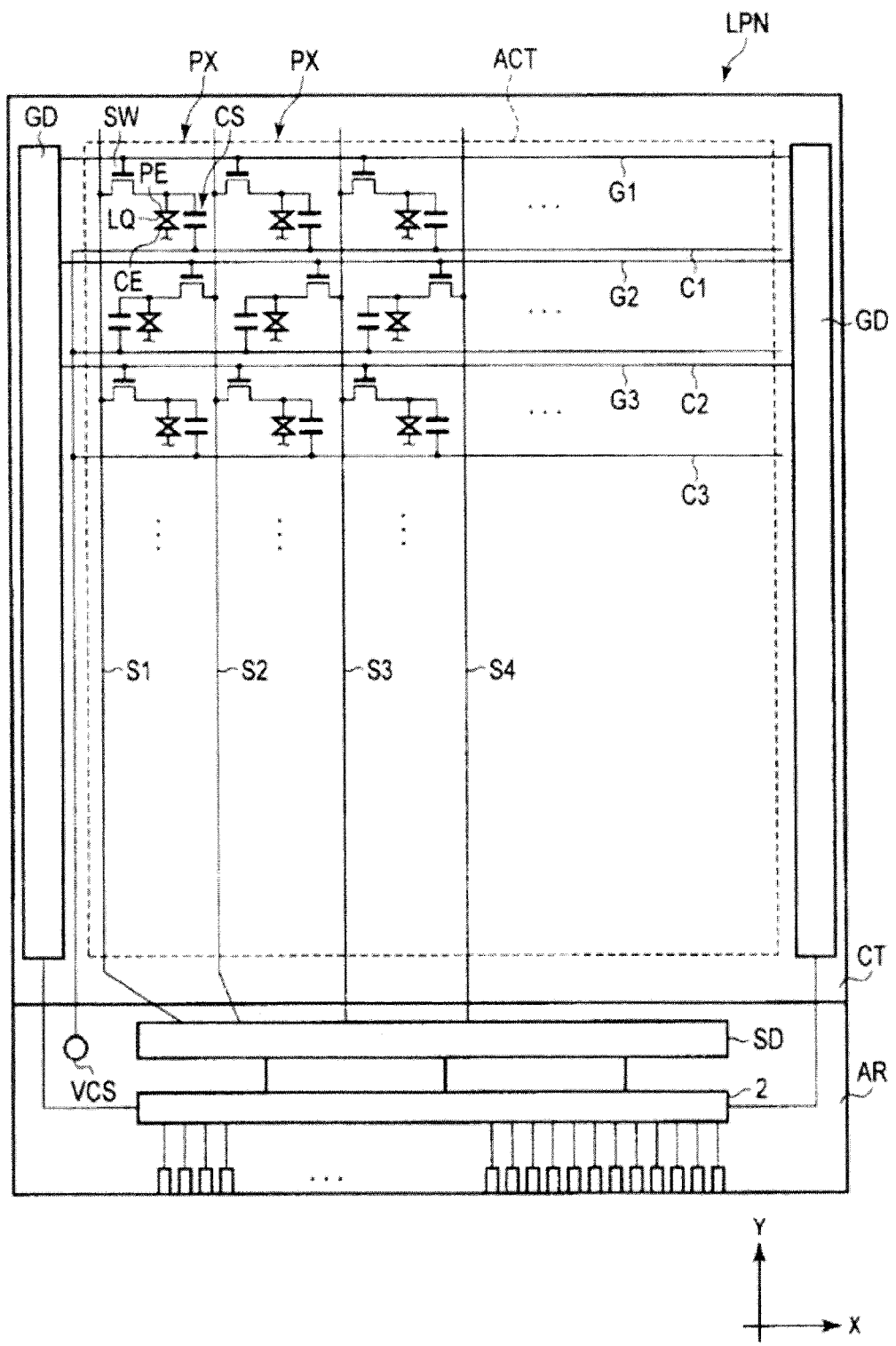
FIG. 1 is a figure schematically showing a structure and an equivalent circuit of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: an array substrate including; pixel electrodes arranged in a matrix of rows and columns, source lines extending in the column direction, gate lines and auxiliary capacitance lines extending in the row direction, and a switching element arranged in a circumference in which the source line crosses the gate line, a counter substrate arranged facing the pixel electrodes; and a liquid crystal layer held between the array substrate and the counter substrate, wherein the pixel electrodes adjoining each other in the column direction are electrically connected with adjoining different source lines through the switching element, respectively, the switching element includes a drain line arranged under the source line and extending to a region under the auxiliary capacitance line, the auxiliary capacitance line includes a branch portion extending along the source line between the source line and the drain line, the pixel electrode electrically connected to one of the adjacent source lines in the row direction is arranged closer to the other source line than one of the source line, and source signals with opposite polarity each other are supplied to the adjacent source lines, respectively.

According to other embodiment, a liquid crystal display device includes: an array substrate including; pixel electrodes arranged in a matrix of rows and columns including first and second pixel electrodes arranged adjacent each other in the column direction, first and second source lines extending in the column direction, first, second and third gate lines extending in the row direction, a first auxiliary capacitance line arranged between the first gate line and the second gate line, and a second auxiliary capacitance line arranged between the second gate line and the third gate line respectively extending in the row direction, and a first switching element arranged in a circumference in which the first source line crosses the second gate line, and a second switching element arranged in a circumference in which the second source line crosses the third gate line, a counter substrate arranged facing the pixel electrodes; and a liquid crystal layer held between the array substrate and the counter substrate, wherein the first pixel electrode is connected with the first source line through the first switching element, the second pixel electrode is connected with the second source line through the second switching element, the first and second switching elements respectively include a drain line arranged under the first and second source lines and extending to a region under the first and second auxiliary capacitance lines, the respective first and second auxiliary capacitance lines include a branch portion extending along the first and second source lines between the first and second source lines and the drain line, the first pixel electrode is arranged closer to the second source line than the first source line, the second pixel electrode is arranged closer to the first source line than the second source line, and source signals with opposite polarity each other are supplied to the first and second source lines, respectively.

FIG. 1 is a figure schematically showing a structure and an equivalent circuit of a liquid crystal display device according to one embodiment. In addition, a vertical alignment mode is used as the alignment mode of the liquid crystal molecules.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. The active area ACT is formed of a plurality of pixels PX arranged in a matrix shape (m×n).

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C linearly extend in a first direction X, respectively. The gate line G and the auxiliary capacitance line C are arranged in turns along a second direction Y that orthogonally intersects the first direction X. The source lines S cross the gate line G and the capacitance line C. The source lines S linearly extend in the second direction Y, respectively. The gate line G, the auxiliary capacitance line C and the source lines S may not necessarily extend linearly, and a portion thereof may be crooked partly.

Each gate line G is pulled out to outside of the active area ACT, and connected to a gate driver GD. Each source line S is pulled out to the outside of the active area ACT, and connected to a source driver SD. At least portions of the gate driver GD and the source driver SD are formed in the array substrate AR, for example. The gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which auxiliary capacitance voltage is impressed.

In addition, in the liquid crystal display panel LPN according to this embodiment, while the pixel electrode PE is formed in the array substrate AR, the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is vertical electric field with respect to the surface of the substrates.

The switching element SW is formed of an n channel type thin film transistor (TFT), for example. The switching element SW is electrically connected with the gate line G and the source line S. In this embodiment, the switching elements SW arranged in the adjacent pixels in the second direction Y are respectively connected with adjacent different source lines S each other. On the other hand, while the switching elements SW arranged in the adjacent pixels in the first direction X are respectively connected with a source line arranged on the same sides each other, i.e., on a left-hand side or a right-hand side of the respective pixels, the switching elements SW are connected with a common gate line G. The switching elements SW may be either a top-gate type or a bottom-gate type. Though the semiconductor layer of the switching element SW is formed of poly-silicon in this embodiment, the semiconductor layer may be formed of amorphous silicon.

The pixel electrode PE is arranged in each pixel PX and electrically connected with the switching element SW. The common electrode CE of common potential is arranged in common to the plurality of pixel electrodes PE interposing the liquid crystal layer LQ. The pixel electrode CE and the common electrode CE are formed of transparent electric conductive materials, such as Indium Tin Oxide (ITO) and Indium Zinc Oxide (IZO), for example.

The array substrate AR includes an electric power supply portion (not shown) to impress the common voltage to the common electrode CE in the outside of the active area ACT. Furthermore, the common electrode CE is drawn to outside of the active area ACT and electrically connected with the electric power supply portion (not shown) of the array substrate AR through an electric conductive component by conductive adhesives such as conductive paste.

Figure 2:
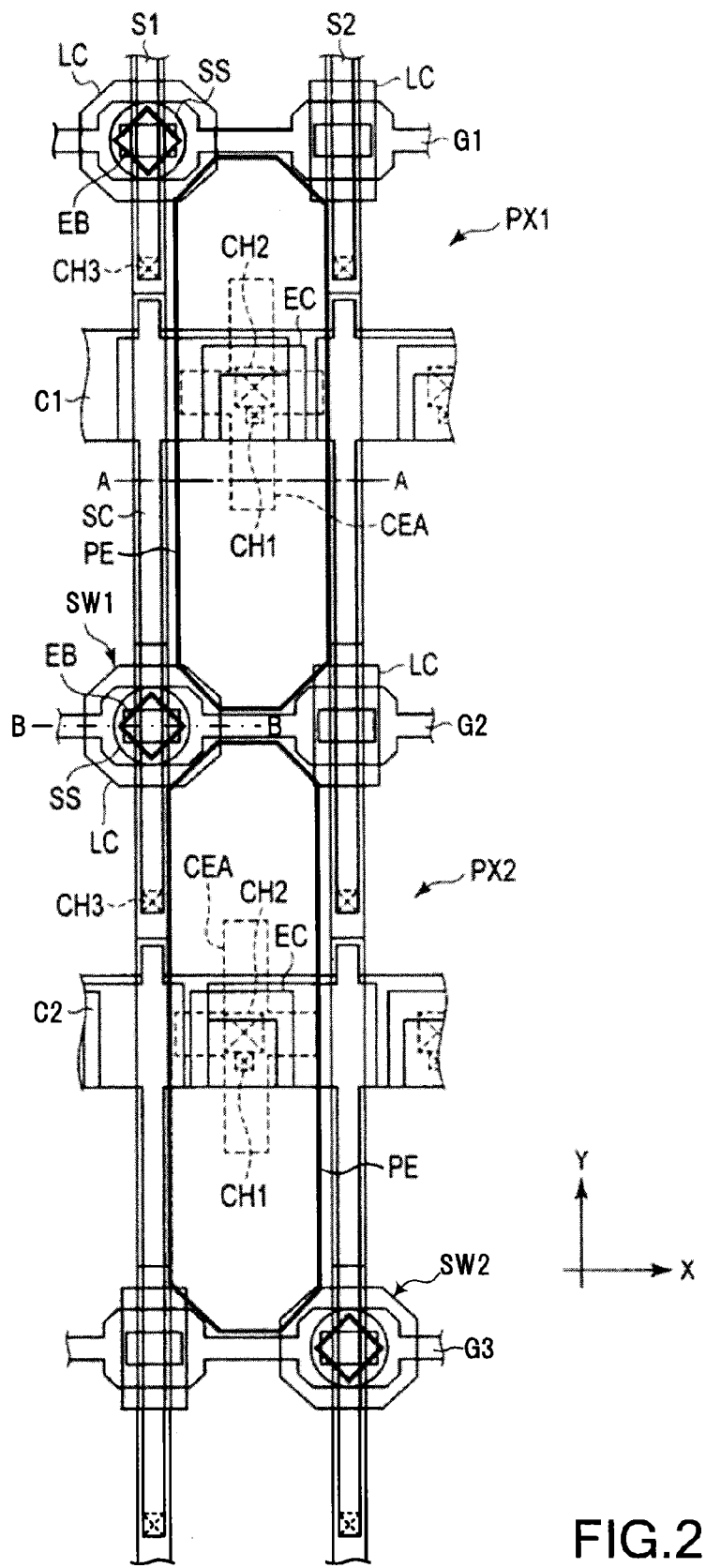
FIG. 2 is a plan view schematically showing a structure of one pixel when the liquid crystal display panel shown in FIG. 1 is seen from a counter substrate side according to the embodiment.

FIG. 2 is a plan view schematically showing a structure of one pixel when the liquid crystal display panel LPN shown in FIG. 1 is seen from a counter substrate side according to the embodiment. Here, pixels arranged in the second direction Y are shown by the plan view in the X-Y plane. Hereinafter, the pixel located on the upper side is denoted by a first pixel PX1, and the pixel located on the lower side in the second direction Y is denoted by a second pixel PX2 for explaining FIG. 2.

A gate line G1, a gate line G2 and a gate line G3 extend along the first direction X. The auxiliary capacitance line C1 is arranged between the adjoining gate line G1 and gate line G2, and extend along the first direction X. The auxiliary capacitance line C2 is arranged between the adjoining gate line G2 and the gate line3, and extends along the first direction X. The source line S1 and the source line S2 extend along the second direction Y.

According to this embodiment, in the first pixel PX1 and second pixel PX2, the source line S1 is arranged at the left-hand side end, and the source line S2 is arranged at the right-hand side end. Precisely, the source line S1 is arranged striding over a boundary between the illustrated pixels PX1 and PX2 and adjoining pixels on their left-hand side. The source line S2 is arranged striding over a boundary between the illustrated pixels PX1 and PX2 and adjoining pixels on their right-hand side, Moreover, in the first pixel PX1, the gate line G1 is arranged at the upper end, and the gate line G2 is arranged at the bottom end. Precisely, the gate line G1 is arranged striding over a boundary between the first pixel PX1 and adjoining pixel on its upper end side, and the gate line G2 is arranged striding over the boundary between the second pixel PX1 and the second pixel PX2 adjoining the first pixel PX1 on its bottom end side. The auxiliary capacitance line C1 is arranged approximately in the central portion of the first pixel PX1.

In the first pixel PX1, a rectangular pixel electrode PE is arranged between the adjoining source line S1 and the source line S2. Moreover, the pixel electrode PE is located between the gate line G1 and the gate line G2. Precisely, in the first pixel PX1, the center position of the pixel electrode PE is located closer to the source line S2 rather than the center position between the source line S1 and the source line S2 in the first direction X. That is, the distance between the end of the pixel electrode PE and the source line S1 in the first direction X is larger than the distance between the end of the pixel electrode PE and the source line S2.

In the second pixel PX2, the gate line G2 is arranged at the upper end, and the gate line G3 is arranged at the bottom end. Precisely, the gate line G2 is arranged striding over the boundary between the second pixel PX2 and the first pixel PX1 adjoining on its upper side, and the gate line G3 is arranged striding over the boundary between the second pixel PX2 and a pixel adjoining the second pixel PX2 on its lower side. The auxiliary capacitance line C2 is arranged approximately in the center position of the second pixel PX2 extending in the first direction X.

In the second pixel PX2, the pixel electrode PE is arranged between the adjoining source line S1 and the source line S2. The pixel electrode PE is located between the gate line G2 and the gate line G3. Precisely, in the second pixel PX2, the center position of the pixel electrode PE is arranged closer to the source line S1 rather than the center position between the source line S1 and the source line S2. That is, the distance between the end of the pixel electrode PE and the source line S1 in the first direction X is smaller than the distance between the end of the pixel electrode PE and the source line S2.

In this embodiment, the switching element SW1 is electrically connected with the gate line G2 and the source line S1 in the first pixel PX1. The switching element SW1 is formed in a position where the gate line G2 crosses the source line S1 each other and its circumference. The source region (semiconductor layer SC) is electrically connected with the source line S1 through a contact hole CH3 formed on a lower side of the gate line G2. Herein, the auxiliary capacitance line C1 includes a branch portion extending along the source line S1 toward the gate line G2. Further, the drain line is electrically connected with the pixel electrode PE on the upper side of the gate line G2 through contact holes CH1 and CH2 formed in a region which overlaps with the auxiliary capacitance line C1. The switching element SW1 is formed in the region which overlaps with the source line S1 and the auxiliary capacitance line C1, and hardly runs off from the region which overlaps with the source line S1 and the auxiliary capacitance line C1. Accordingly, reduction of the aperture area contributing to the display is suppressed.

In the second pixel PX2, the switching element SW2 is electrically connected with the gate line G3 and the source line S2. The switching element SW2 is formed in a position where the gate line G3 crosses the source electrode S2 and its circumference. The source electrode (semiconductor layer SC) is electrically connected with the source line S2 through a contact hole formed on a lower side of the gate line G3. Herein, the auxiliary capacitance line C2 includes a branch portion extending along the source line S2 toward the gate line G3. Further, the drain line is electrically connected with the pixel electrode PE on the upper side of the gate line G3 through contact holes CH1 and CH2 formed in a region which overlaps with the auxiliary capacitance line C2. The switching element SW2 is formed in a region which overlaps with the source line S2 and the auxiliary capacitance line C2, and hardly runs off from the region which overlaps with the source line S2 and the auxiliary capacitance line C2. Accordingly, reduction of the aperture area contributing to the display is suppressed.

Figure 3:
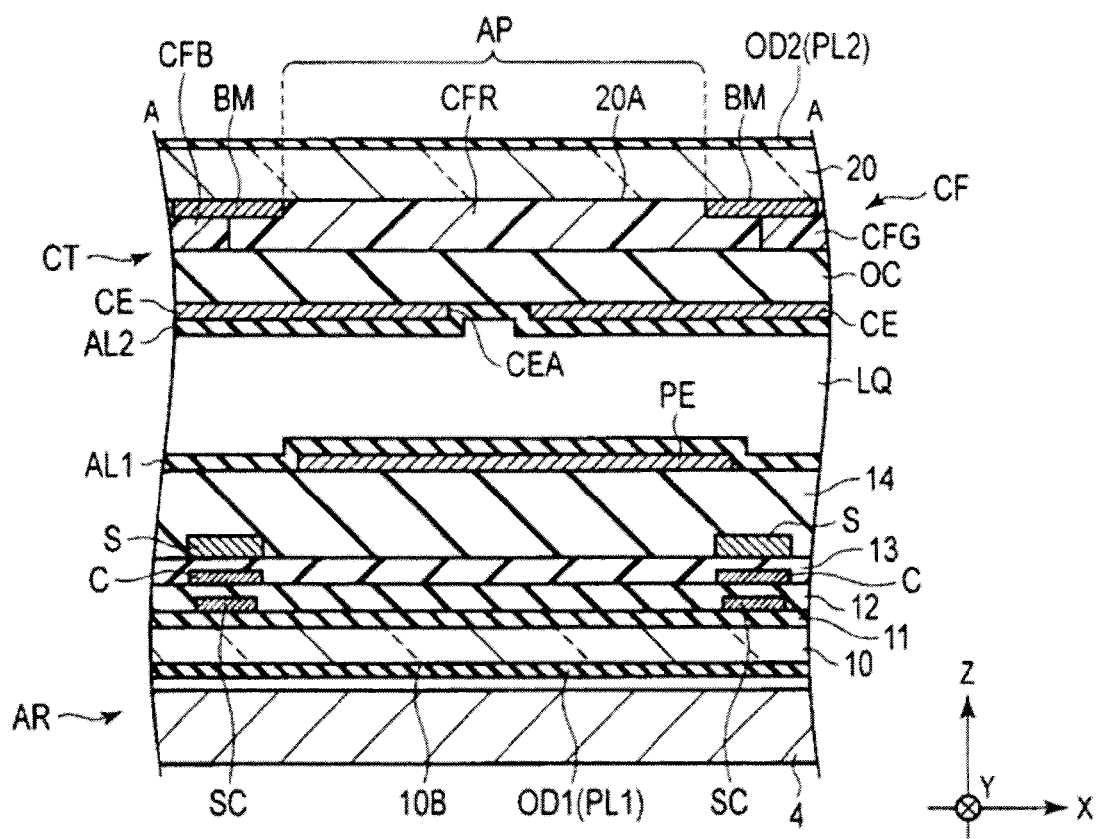
FIG. 3 is a cross-sectional view schematically showing the structure of the liquid crystal display panel taken along line A-A shown in FIG. 2.

FIG. 3 is a cross-sectional view schematically showing the structure of the liquid crystal display panel taken along line A-A shown in FIG. 2. In addition, only the portion required for explanation is illustrated here.

A backlight 4 is arranged on the back side of the array substrate AR in the illustrated example. Various types of backlights 4 can be used. For example, a light emitting diode (LED) or a cold cathode fluorescent lamp (CCFL), etc., can be applied as a light source of the backlight BL. In addition, the explanation about its detailed structure is omitted.

The array substrate AR is formed using a first insulating substrate 10 which has a light transmittive characteristics. The first insulating substrate 10 is covered with the first interlayer insulating film 11. The semiconductor layer SC (drain electrode) is arranged on the first interlayer insulating film 11, and covered with the second interlayer insulating film 12. The auxiliary capacitance line C is arranged on a second interlayer insulating film 12, and covered with the third interlayer insulating film 13. In addition, although not illustrated here, the gate line is arranged in the same layer as the auxiliary capacitance line C. The source line S is arranged on the third interlayer insulating film 13, and covered with a planarization film 14. The source line S is arranged on the semiconductor layer SC, and the auxiliary capacitance line C extends between the source line S and the semiconductor layer SC so as to face the semiconductor layer SC. That is, the source line S, the auxiliary capacitance line C and the semiconductor layer SC are superimposed in a third direction Z.

The third direction Z is a direction which perpendicularly intersects the first direction X and the second direction Y, i.e., a normal direction of the liquid crystal display panel LPN. The pixel electrode PE is arranged on the planarization film 14, and covered with the first alignment film ALL.

The first alignment film AL1 is arranged on the array substrate AR facing the counter substrate CT, and extends to whole active area ACT. The first alignment film AL1 covers the pixel electrode PE, etc., and is also arranged on the planarization film 14. The first alignment film AL1 is formed of material which shows a vertical alignment characteristics.

The counter substrate CT is formed using a second insulating substrate 20 which has a transmissive characteristics. The counter substrate CT includes a black matrix BM, a color filter CF, an overcoat layer OC, a common electrode CE, and a second alignment film AL2, etc.

The black matrix BM forms an aperture AP facing the pixel electrode PE by defining each pixel PX. That is, the black matrix BM is arranged so that wiring portions, such as the source line S, the gate line G, the auxiliary capacitance line C, and the switching element SW, may counter the black matrix BM. Herein, though only a portion of the black matrix BM extending along the second direction Y is shown, the black matrix BM may include a portion extending along the first direction X. The black matrix BM is formed on an internal surface 20A of the second insulating substrate 20 facing the array substrate AR.

The color filter CF is arranged corresponding to each pixel PX. That is, while the color filter CF is arranged in the aperture portion AP in the internal surface 20A of the second insulating substrate 20, a portion thereof extends on the black matrix BM. The colors of the color filters CF arranged in the adjoining pixels PX in the first direction X differ mutually. For example, the color filters CF are formed of resin materials colored by three primary colors of red, blue, and green, respectively. Each colored layer CF forming each color filter extends in the second direction Y in the active area ACT. That is, each colored layer is arranged so that each colored layer faces the pixel electrode arranged in the second direction Y and that the differently colored layers are arranged in the first direction X.

The red color filter CFR formed of resin material colored in red is arranged corresponding to the red pixel. The blue color filter CFB formed of resin material colored in blue is arranged corresponding to the blue pixel. The green color filter CFG formed of resin material colored in green is arranged corresponding to the green pixel. The boundary between the adjoining color filters CF is located in a position which overlaps with the black matrix BM.

The overcoat layer OC covers the color filter CF. The overcoat layer OC eases influence by unevenness of the surface of the color filter CF.

The common electrode CE is formed on the overcoat layer OC facing the array substrate AR. The common electrode CE is arranged so that a plurality of pixel electrodes PE counters the common electrode CE, and formed in the whole active area ACT. The common electrode CE is removed in one portion where the common electrode CE counters the pixel electrode PE. In this embodiment, the common electrode CE includes a removed portion CEA (shown in FIG. 2) in the shape of a cross arranged approximately in the center of the aperture AP. The removed portion CEA is formed in the shape in which the removed portion extending in parallel to the first direction X crosses the removed portion extending in parallel to the second direction Y. Thus, by forming the removed portion CEA in the common electrode CE, it becomes possible to form a plurality of domains in one pixel by controlling the alignment of the liquid crystal molecules, in which respective alignment directions are different each other, and to improve viewing angle characteristic. In addition, the removed portion CEA of the common electrode CE is a region which does not penetrate light.

The second alignment film AL2 is arranged on the counter substrate CT facing the array substrate AR, and extends to whole active area ACT. The second alignment film AL2 covers the common electrode CE, the overcoat layer OC, etc. The second alignment film AL2 is formed of the materials having vertical alignment characteristics.

Figure 4:
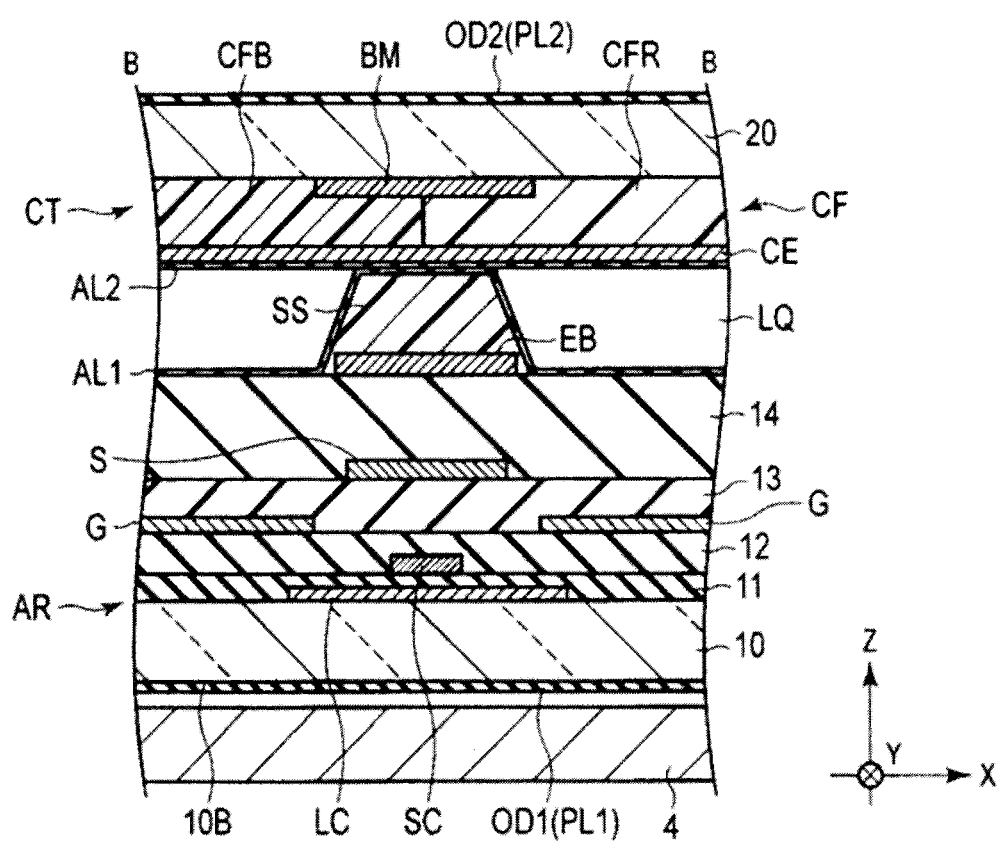
FIG. 4 is a cross-sectional view schematically showing the structure of the liquid crystal display panel taken along line B-B shown in FIG. 2.

FIG. 4 is a cross-sectional view schematically showing the structure of the liquid crystal display panel taken along line B-B shown in FIG. 2. In addition, only the portion required for explanation is illustrated here in a cross-section of a position where the pillar-shaped spacer SS is arranged.

A shield layer LC is arranged on a first insulating substrate 10, and covered with the first interlayer insulating film 11. The shield layer LC is arranged under a position where the semiconductor layer SC crosses the gate line G. The shield layer LC shields a position where the pillar-shaped spacer SS to be mentioned later is arranged and its circumference, and avoids generation of bright line in the circumference of the pillar-shaped spacer SS. In addition, the shield layer LC may be a portion of various wirings formed on the first insulating substrate 10 such as the gate line G and source line S. It is possible to suppress display defect due to positional shift of the pillar-shaped spacer SS by providing the shield layer LC on the array substrate AR. The shield layer LC may be a portion of the black matrix on the counter substrate CT.

The semiconductor layer SC is arranged on the shield layer LC interposing the first insulating film 11, and covered with the second interlayer insulating film 12.

The gate line G is arranged so that the gate line G crosses with the semiconductor layer SC on the second interlayer insulating film 12. The gate line G branches on the semiconductor layer SC, and intersects at two places of the semiconductor layer SC. The gate line G1 is covered with the third interlayer insulating film 13.

The source line S is arranged on the semiconductor layer SC interposing the third interlayer insulating film 13, and covered with the planarization film 14.

The pillar-shaped spacer SS is formed on the planarization film 14 interposing an underground layer EB and covered with the first alignment film AL1. The underground layer EB is arranged in the same layer as the pixel electrode PE. The pillar-shaped spacer SS is formed, for example, of resin material.

The array substrate AR and the counter substrate CT as mentioned-above are arranged so that the first alignment film AL1 and the second alignment film AL2 face each other. The pillar-shaped spacer SS is formed integrally with one of the substrates by resin material between the first alignment film AL1 on the array substrate AR and the second alignment film AL2 on the counter substrate CT. Thereby, a predetermined gap, for example, a 2-7 μm cell gap is formed. The array substrate AR and the counter substrate CT are pasted together by seal material arranged outside the active area ACT while the predetermined cell gap is formed. In addition, the first and second alignment films AL1 and AL2 are formed of vertical alignment films to vertically align the liquid crystal layers LQ.

The liquid crystal layer LQ is held in the cell gap formed between the array substrate AR and the counter substrate CT and arranged between the first alignment film AL1 and the second alignment film AL2. The liquid crystal layer LQ is constituted by liquid crystal material having negative dielectric anisotropy (negative type). When electric field is not applied, the liquid crystal molecules contained in the liquid crystal layer LQ is aligned vertically with respect to the surfaces of the array substrate AR and the counter substrate CT. On the other hand, when the electric field is applied, the liquid crystal molecules are horizontally aligned with respect to the surfaces of the array substrate AR and the counter substrate CT.

A first optical element OD1 is attached on an external surface 10B of the array substrate AR, i.e., the external surface 10B of the first insulating substrate 10 which constitutes the array substrate AR, by adhesives, etc. The first optical element OD1 is located on a side which counters with the backlight 4 of the liquid crystal display panel LPN, and controls the polarization state of the incident light which enters into the liquid crystal display panel LPN from the backlight 4. The first optical element OD1 includes a first polarization plate PL1 having a first polarizing axis (or first absorption axis) AX1.

A second optical element OD2 is attached on an external surface of the counter substrate CT, i.e., the external surface 20B of the second insulating substrate 20 which constitutes the counter substrate CT by adhesives, etc. The second optical element OD2 is located on a display surface side of the liquid crystal display panel LPN, and controls the polarization state of emitted light from the liquid crystal display panel LPN. The second optical element OD2 includes a second polarization plate PL2 having a second polarizing axis (or second absorption axis) AX2.

In this embodiment, the width of the source line in the X direction is set to approximately 3 μm, and the width of the source line in a direction orthogonally crossing the extending direction of the black matrix BM is set to approximately 4 μm.

Generally, in the liquid crystal display device which adopts a column inversion driving as one of polarity-inversion driving methods for the liquid crystal display device, for example, when an approximately rectangular window is displayed in the center of the active area ACT, vertical cross-talk may arise due to coupling capacitance between the pixel electrode PE and the source line S. In this embodiment, in order to avoid the vertical cross talk, potential change of the source line S is set to the same potential change as the column inversion driving. Further, the pixel electrodes PE adjoining in the second direction Y are connected with adjoining different source lines S, respectively, through the switching element SW.

In this embodiment, the pixel electrode PE is eccentrically arranged closer to the adjacent source line S2 in the first direction X than the source line S1 connected to the switching element SW1, in which an opposite polarity voltage is supplied to the adjacent source line S2 with respect to the source line S1 connected to the electrode PE in the first pixel PX. In the second pixel PX2, the pixel electrode PE is eccentrically arranged closer to the adjacent source line S1 than the source line S2 connected to the switching element SW2 in the first direction X. Thereby, balance of coupling capacitance between the pixel electrode PE and the source line S is adjusted, and generation of vertical cross talk is controlled.

Moreover, when capacitance generated between the pixel electrode PE and the gate line G is shown in Cgs, and whole amount of capacitance generated in each pixel is shown in Cload, the punch-through voltage in each pixel is calculated by the following formula.

Punch-through voltage=$(Cgs/Cload) \times \Delta V$ ($\Delta V$: gate voltage)

According to this formula, the punch-through voltage is in proportional to the capacitance Cgs and in inverse proportional to the whole capacitance amount Cload of the pixel. For example, in a high definition liquid crystal display panel, since the whole pixel capacitance Cload is comparatively small, the punch-through voltage becomes large easily. Therefore, in order to make capacitance Cgs small, the pixel electrode PE is formed in the shape of an octagon by removing four corners of a rectangle, without making the pixel electrode PE into the shape of a rectangle with a right angle.

For example, when the pixel electrode PE is formed substantially in the rectangular shape, if the pixel electrode PE is extended to near the gate line G and the source line S, the region in which the gate line G counters the pixel electrode PE becomes large, and the capacitance Cgs becomes large. Furthermore, if the region where the gate line G counters the approximately rectangular pixel electrode PE is made small, it is difficult to arrange the pixel electrode PE near the gate line G and the source line S, and to enlarge the aperture.

On the other hand, if the pixel electrode PE is made into the shape of an octagon, the capacitance Cgs is made small since the corners of the pixel electrode PE is cut-out on the gate line G. Furthermore, the aperture region can be enlarged by extending the pixel electrode to near the gate line G and the source line S.

Furthermore, in this embodiment, the branch portion of the auxiliary capacitance line C extends along the source line S between the semiconductor layer SC and the source line S. Accordingly, it becomes possible to reduce the coupling capacitance between the source line S and the semiconductor layer SC by arranging the auxiliary capacitance line C therebetween. That is, the coupling capacitance between the source line S and the pixel electrode PE can be made small, and it becomes possible to reduce the influence to the pixel potential by the potential change of the source line S. In addition, the auxiliary capacitance can be increased by the capacitance formed between the branch portion of the auxiliary capacitance line C and the semiconductor layer SC arranged along the source line S. As a result, the width in the second direction Y of the auxiliary capacitance line C extending in the first direction X can be made small, and the aperture can be also enlarged.

Moreover, according to this embodiment, the branch portion of the auxiliary capacitance line C and the semiconductor layer SC extend beyond the auxiliary capacitance line C along the source line S toward the gate line G1. Thereby, the auxiliary capacitance formed in the region along the source line S can be further increased.

The liquid crystal display panel LPN is equipped with a plurality of pillar-shaped spacers SS to keep the gap between array substrate AR and the counter substrate CT constant. When forming the pillar-shaped spacers SS on the array substrate AR by a photolithographic method, the pillar-shaped spacers SS are arranged so as to avoid the aperture AP. Thereby, high display grace can be obtained.

With respect to the locations for arranging the pillar-shaped spacer SS, it is preferable to select locations capable of securing stable flatness for both of the array substrate AR and the counter substrate CT and to provide the pillar-shaped spacer SS with the same positional relationship in each pixel. For this reason, the pillar-shaped spacers SS are arranged not so as to overlap with the aperture portion AP. Furthermore, in order to maintain the flatness of the substrates, the pillar-shaped spacers SS are arranged so as to avoid the circumference of the contact holes CH1-CH3 of the array substrate AR.

While keeping the gap between two substrates constant by arranging the pillar-shaped spacer SS in the position which counters the black matrix BM, the decrease in the aperture ratio by arranging the pillar-shaped spacer SS is controlled, and high brightness is achieved. The constant cell gap is achieved by selectively arranging the pillar-shaped spacer SS and raising the accuracy of its height.

In the liquid crystal display device according to this embodiment, the pillar-shaped spacer SS is arranged in the circumference of the intersection of the source line S and the gate line G. The underground layer EB is arranged under the pillar-shaped spacer SS in the same level layer as the pixel electrode PE. The underground layer EB is formed with the same material as the pixel electrode PE. The underground layer EB is formed in the shape of an island arranged apart from the pixel electrode PE. By arranging the underground layers EB such as ITO under the pillar-shaped spacer SS, it is avoidable that the pillar-shaped spacer SS peels-off from the array substrate AR.

Figure 5:
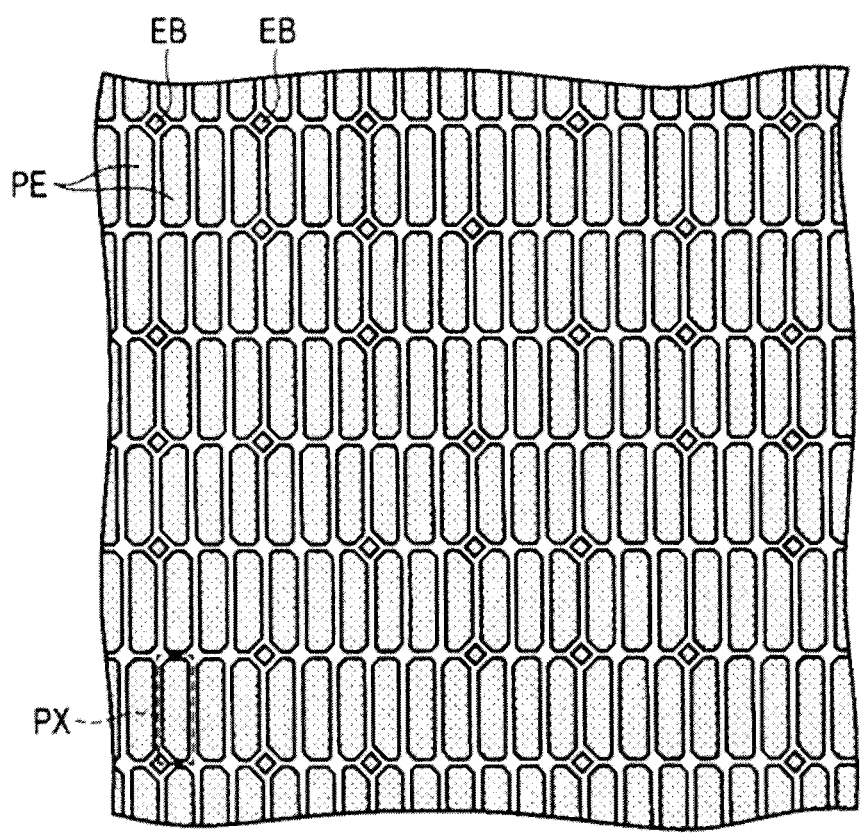
FIG. 5 is a view showing arrangement patterns of pixel electrodes and underground layers according to the embodiment.

FIG. 5 is a view showing arrangement patterns of the pixel electrode PE and the underground layer EB according to the embodiment.

In this embodiment, the pillar-shaped spacers SS are arranged every three or six source lines S located in the first direction X. That is, the pillar-shaped spacer SS is arranged on the source line S between predetermined color pixels, for example, red, green and blue color pixels. In addition, the pillar-shaped spacers SS do not need to be arranged in all the positions where the source lines S crosses the gate lines G. Furthermore, the pillar-shaped spacer SS is arranged so that the arrangement locations are not eccentrically distributed.

Since the pixel electrode PE is arranged so that the pixel electrode PE may not be electrically connected with the underground layer EB, the corners of the pixel electrode PE is greatly cut out around the underground layer EB. Therefore, the pixel electrode PE arranged around the pillar-shaped spacer SS is formed in a different shape from other pixel electrodes PE.

The shield layer LC is arranged under the switching element SW. In this embodiment, since the switching element SW is arranged in the position where the source line S crosses the gate line G and its circumference, the shield layer LC is arranged under the position where the source line S crosses the gate line G.

Figure 6:
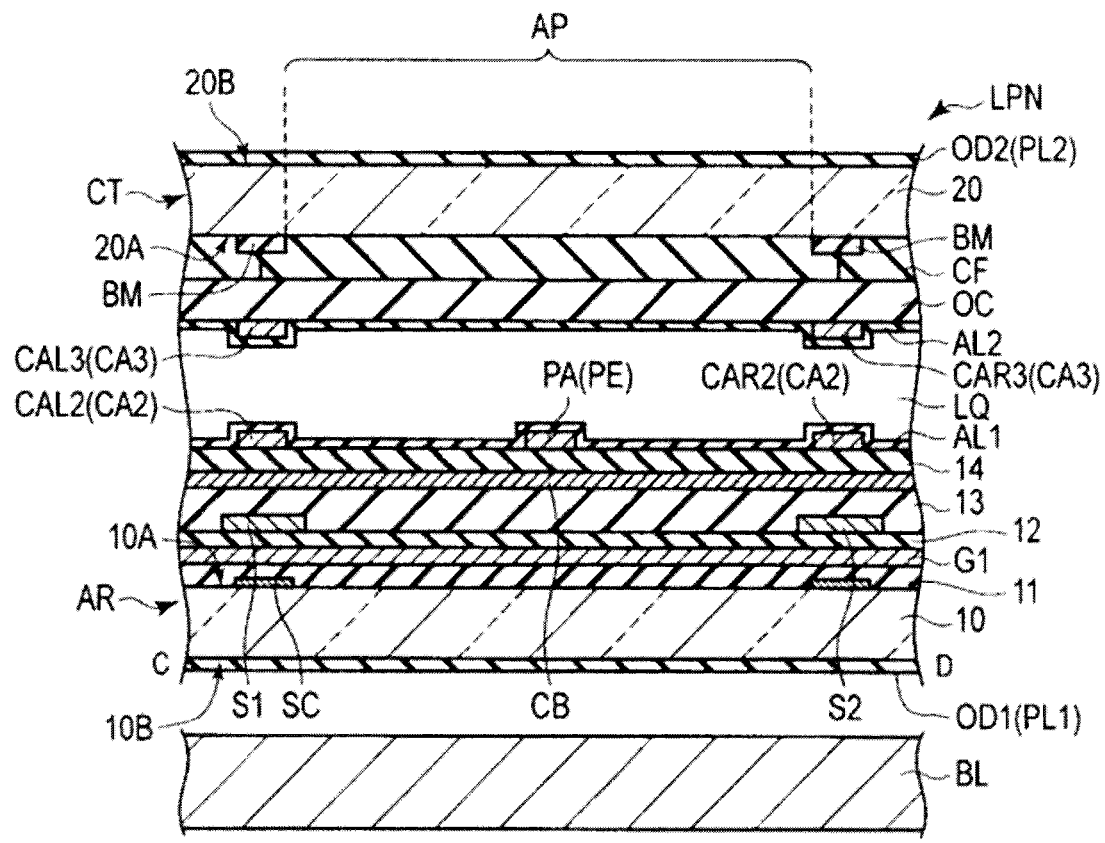
FIG. 6 is a view showing an arrangement pattern of a shield layer LC according to the embodiment.

FIG. 6 is a view showing an arrangement pattern of the shield layer LC according to the embodiment.

The shield layer LC is arranged in the position where the source line S crosses the gate line G and in its circumference. Moreover, the shield layer LC arranged under the pillar-shaped spacer SS is formed larger than other shield layers. Since the pillar-shaped spacer SS is arranged, the alignment state of the liquid crystal molecule located in its circumference may be disturbed. However the deteriorations of the display grace is avoided by arranging the shield layer LC under the pillar-shaped spacer SS. In this embodiment, the shield layer LC arranged under the switching element SW and the pillar-shaped spacer SS is used in common, and formed larger than other shield layers LC so that the circumference of the pillar-shaped spacer SS can be shielded. That is, the shield layer LC arranged under the underground layer EB is formed larger than other shield layers LC.

As mentioned above, the aperture region of the pixel PX can be sufficiently secured by enlarging only the shield layer LC arranged under the pillar-shaped spacer SS.

Although, in the above embodiment, the removed portion of the common electrode CE is formed in the cross shape, the removed portion formed in an I shape may be applicable, in which the removed portion is formed in parallel to only the source line S. That is, the removed portion is not formed in parallel to the gate line.

Moreover, the pillar-shaped spacer SS may be formed on the counter substrate CT. In this case, the shield layer LC on the array substrate AR facing the pillar-shaped spacer SS is formed larger than other shield layers LC. For this reason, even if the alignment state is disturbed in the circumference of the pillar-shaped spacer SS, since the disturbed portion is shielded by the shield layer LC, the deterioration of the display grace is avoided like the above-mentioned embodiment.

In the liquid crystal display device according to the above-mentioned embodiments, the vertical alignment mode is adopted as one example. However, in the liquid crystal display device which adopts other alignment modes such as the ECB mode, the FFS mode, etc., the same effect as above embodiments can be achieved by arranging the pillar-shaped spacer like the above-mentioned embodiment.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device, comprising:
an array substrate including:
  a first pixel electrode,
  a first source line and a second source line which are arranged in a first direction and extend in a second direction crossing the first direction,
  a first gate line, an auxiliary capacitance line, and a second gate line which are arranged in the second direction and extend in the first direction, and
  a switching element including a semiconductor layer which includes a first portion overlapping the first source line and extending in the second direction and a second portion overlapping the auxiliary capacitance line and extending in the first direction;
a counter substrate arranged facing the first pixel electrode; and
a liquid crystal layer held between the array substrate and the counter substrate, wherein
the auxiliary capacitance line includes a branch portion extending along the first source line toward the second gate line and formed on a layer between the first source line and the semiconductor layer,
a first spacer is arranged in a first region in which the second gate line crosses the first source line between the array substrate and the counter substrate,
the array substrate further includes a first shield layer arranged under the first region and a second shield layer arranged under a second region in which the second gate line crosses the second source line, and
the first shield layer is formed larger than the second shield layer.

2. The liquid crystal display device according to claim 1, wherein the first pixel electrode is formed in a rectangular shape, and the corners of the first pixel electrode are cut-out.

3. The liquid crystal display device according to claim 2, wherein
the array substrate further includes second to fourth pixel electrodes,
each of the first to fourth pixel electrodes is formed in an octagon shape,
the first pixel electrode includes a first cut-out portion,
the second pixel electrode includes a second cut-out portion adjoining the first cut-out portion in the second direction,
the third pixel electrode includes a third cut-out portion adjoining the second cut-out portion in the first direction,
the fourth pixel electrode includes a fourth cut-out portion adjoining the third cut-out portion in the second direction, and
the first spacer is arranged on the first region surrounded with the first to fourth cut-out portions.

4. The liquid crystal display device according to claim 1, further comprising a second spacer, wherein
the array substrate further includes second to sixth pixel electrodes,
the first to sixth pixel electrodes are arranged in the first direction,
the first spacer and the second spacer are arranged in the first direction, and
the first to third pixel electrodes or the first to sixth pixel electrodes are arranged between the first spacer and the second spacer.

5. The liquid crystal display device according to claim 1, wherein the first pixel electrode is arranged closer to the second source line than to the first source line in the first direction.

6. The liquid crystal display device according to claim 1, wherein source signals with opposite polarity to each other are supplied to the first and second source lines, respectively.

* * * * *